(12) United States Patent
Hewitt et al.

(10) Patent No.: US 9,284,833 B2
(45) Date of Patent: *Mar. 15, 2016

(54) METHOD OF TRACING FLOW OF HYDROCARBON FROM A SUBTERRANEAN RESERVOIR

(71) Applicant: Johnson Matthey PLC, London (GB)

(72) Inventors: Paul Hewitt, League City, TX (US); Jonathon Dean Spencer, League City, TX (US); Vincent Brian Croud, Sheffield (GB)

(73) Assignee: Johnson Matthey PLC, London (GB)

( * ) Notice: Subject to any disclaimer, the term of this patent is extended or adjusted under 35 U.S.C. 154(b) by 29 days.

This patent is subject to a terminal disclaimer.

(21) Appl. No.: 14/169,679

(22) Filed: Jan. 31, 2014

(65) Prior Publication Data

US 2014/0174730 A1    Jun. 26, 2014

Related U.S. Application Data

(63) Continuation of application No. 13/918,527, filed on Jun. 14, 2013, now Pat. No. 8,640,773, which is a continuation of application No. 13/645,778, filed on Oct. 5, 2012, now abandoned.

(60) Provisional application No. 61/543,359, filed on Oct. 5, 2011.

(51) Int. Cl.
| | |
|---|---|
| *E21B 43/26* | (2006.01) |
| *E21B 47/10* | (2012.01) |
| *C09K 8/00* | (2006.01) |
| *E21B 49/00* | (2006.01) |
| *C09K 8/68* | (2006.01) |

(52) U.S. Cl.
CPC ............... *E21B 47/1015* (2013.01); *C09K 8/00* (2013.01); *C09K 8/68* (2013.01); *E21B 43/26* (2013.01); *E21B 49/00* (2013.01)

(58) Field of Classification Search
None
See application file for complete search history.

(56) References Cited

U.S. PATENT DOCUMENTS

| | | | |
|---|---|---|---|
| 3,623,842 | A | 11/1971 | Deans |
| 4,099,565 | A | 7/1978 | Sheely, Jr. et al. |
| 4,168,746 | A | 9/1979 | Sheely |
| 4,501,324 | A | 2/1985 | Sandiford et al. |

(Continued)

FOREIGN PATENT DOCUMENTS

| | | |
|---|---|---|
| EP | 1 991 759 B1 | 11/2008 |
| WO | WO 2012/091599 A1 | 7/2012 |

OTHER PUBLICATIONS

USPTO Non-Final Rejection dated Aug. 27, 2013 for USPTO U.S. Appl. No. 13/918,527.

(Continued)

*Primary Examiner* — Angela M DiTrani
(74) *Attorney, Agent, or Firm* — Gary D. Mangels

(57) ABSTRACT

A method of tracing flow of hydrocarbon from a subterranean reservoir including forming a dispersion, injecting a hydraulic fracturing fluid containing the dispersion down a well penetrating a hydrocarbon reservoir, thereafter collecting a sample of hydrocarbon fluid flowing from the reservoir, and analyzing the sample to determine whether the tracer compound is present in the sample. The dispersion includes a discontinuous condensed phase having a hydrocarbon-soluble tracer compound and a continuous phase which includes an aqueous liquid.

26 Claims, 4 Drawing Sheets

(56) References Cited

U.S. PATENT DOCUMENTS

| | | | |
|---|---|---|---|
| 4,520,109 A | 5/1985 | Simmonds | |
| 4,671,352 A | 6/1987 | Magee, Jr. et al. | |
| 4,755,469 A | 7/1988 | Showalter et al. | |
| 5,077,471 A | 12/1991 | Smith, Jr. et al. | |
| 6,068,054 A | 5/2000 | Bragg | |
| 6,659,175 B2 | 12/2003 | Malone et al. | |
| 7,032,662 B2 | 4/2006 | Malone et al. | |
| 7,472,748 B2 * | 1/2009 | Gdanski et al. | 166/250.1 |
| 8,342,241 B2 | 1/2013 | Hartshorne et al. | |
| 8,640,773 B2 * | 2/2014 | Hewitt et al. | 166/252.6 |
| 2011/0277996 A1 | 11/2011 | Cullick et al. | |
| 2013/0341012 A1 | 12/2013 | Belani et al. | |
| 2014/0000357 A1 | 1/2014 | Pissarenko et al. | |

OTHER PUBLICATIONS

Kleven, R. et al., SPE 35651, Non-Radioactive Tracing of Injection Gas in Reservoirs, 1995, Society of Petroleum Engineers.

Senum, G. et al., SPE/DOE 24137, Petroleum Reservoir Characterization by Perfluorocarbon Tracers, SPE/DOE Eighth Symposium on Enhanced Oil Recovery, Tulsa, Oklahoma, Apr. 22-24, 1992.

* cited by examiner

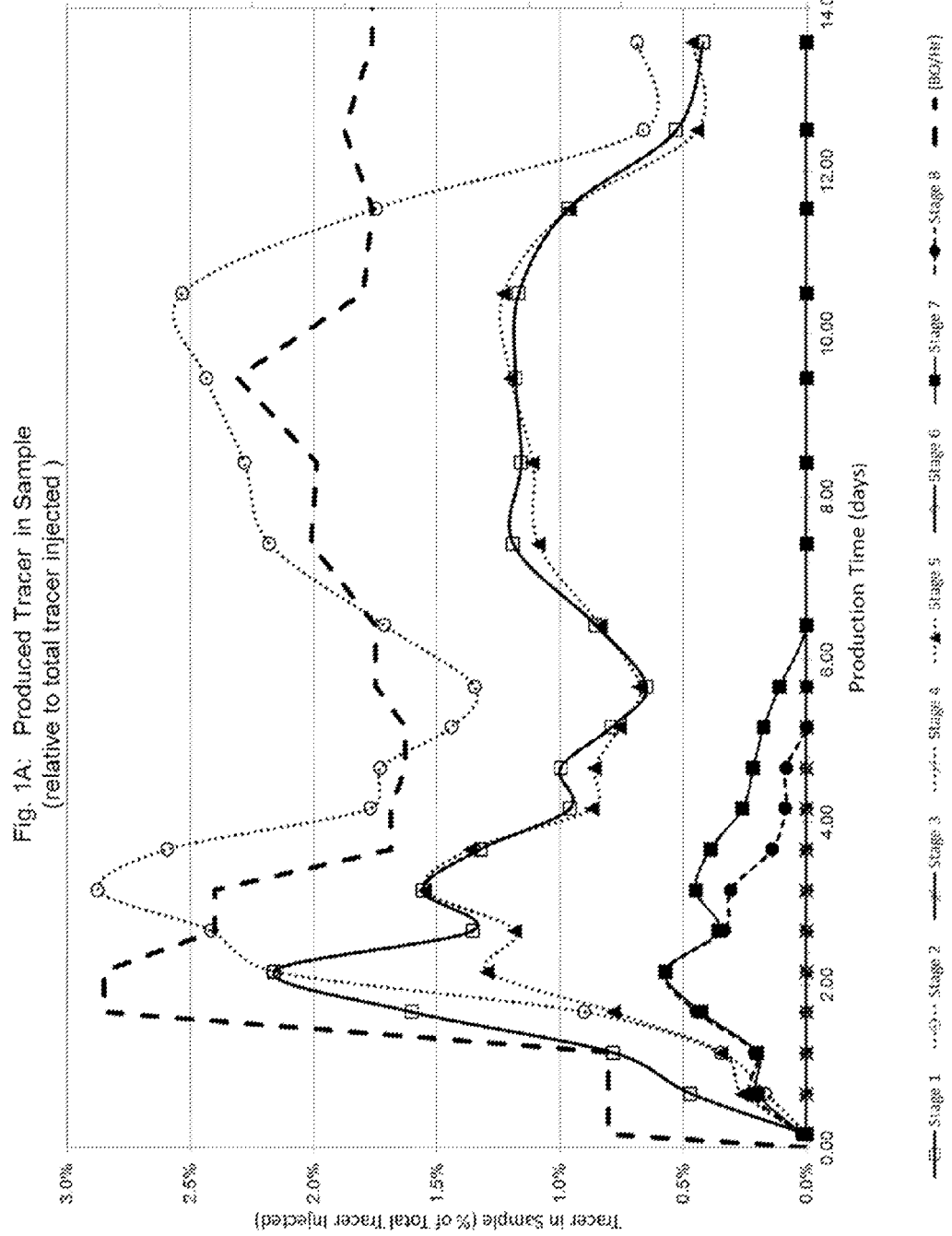

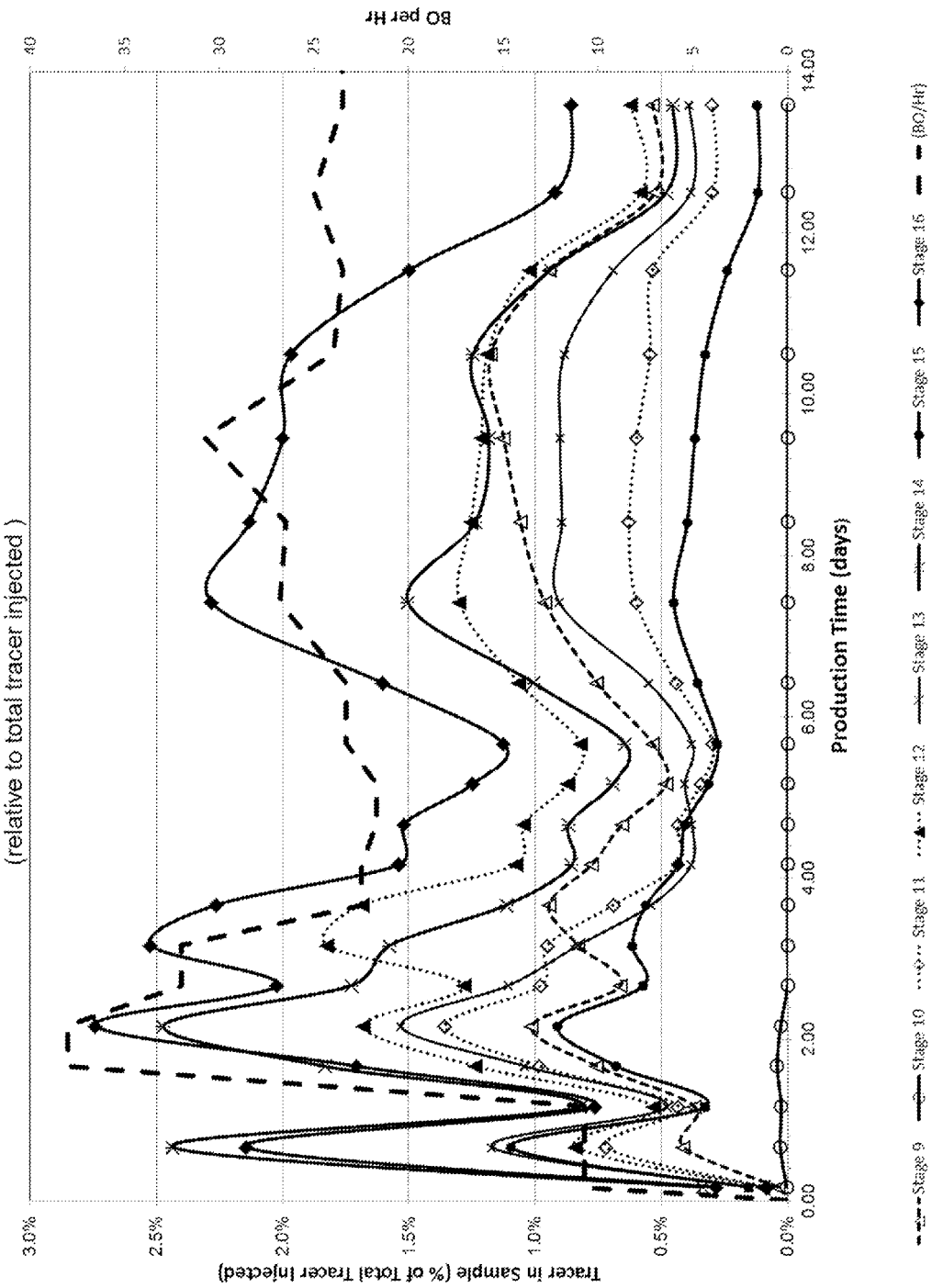

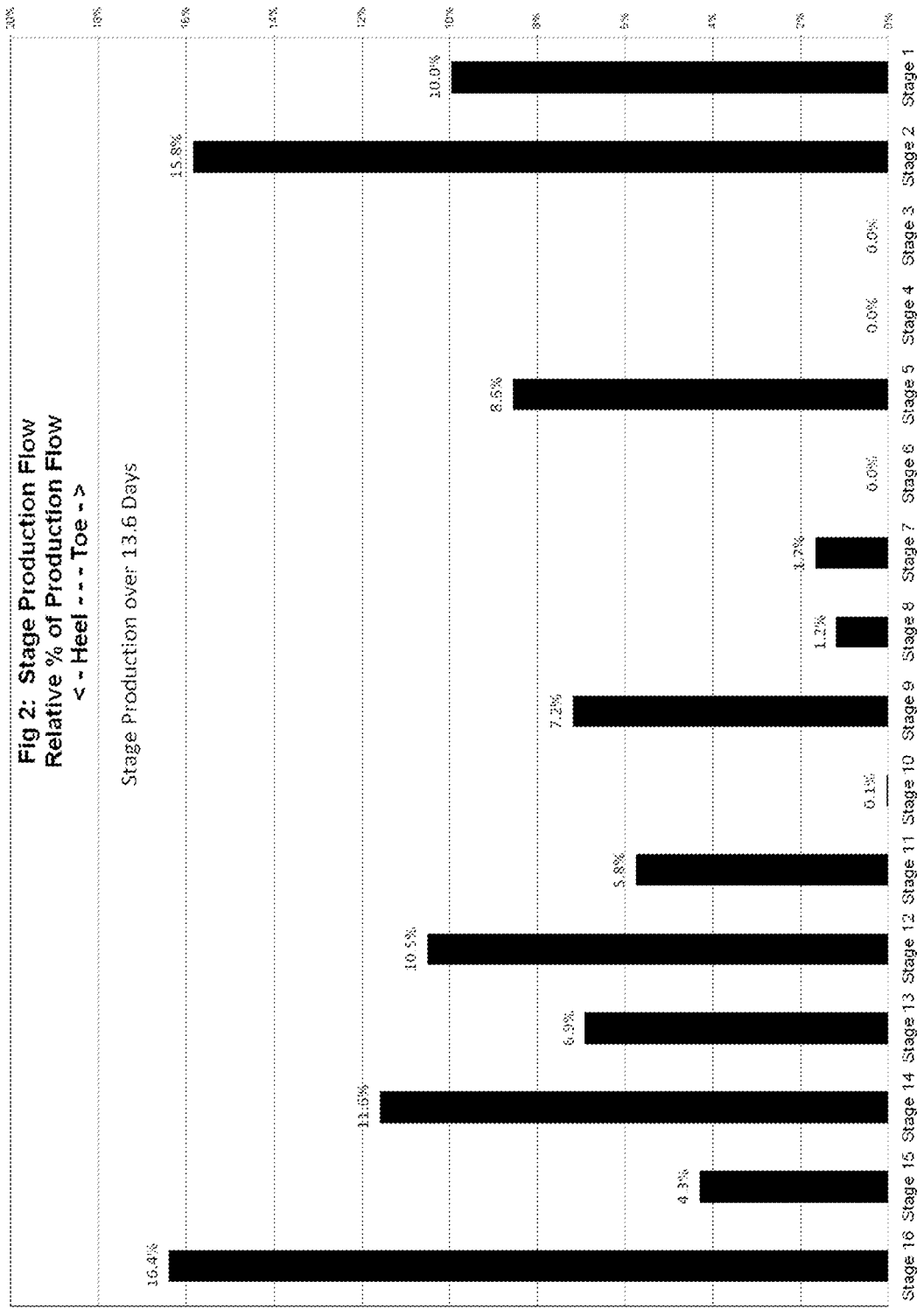

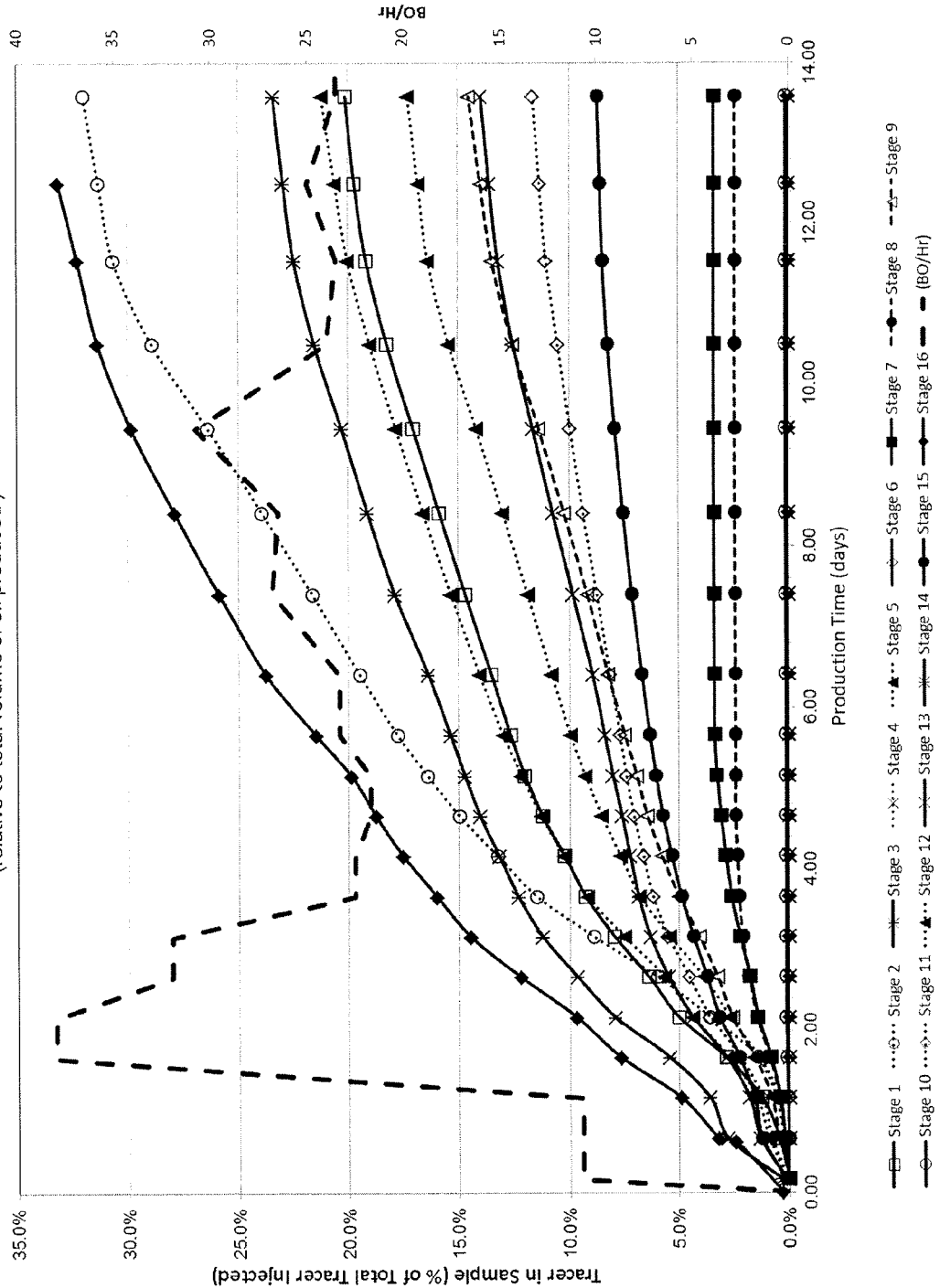

METHOD OF TRACING FLOW OF HYDROCARBON FROM A SUBTERRANEAN RESERVOIR

CROSS-REFERENCE TO RELATED APPLICATIONS

This application is a continuation of U.S. patent application Ser. No. 13/918,527, filed Jun. 14, 2013 which is a continuation of U.S. patent application Ser. No. 13/645,778, filed Oct. 5, 2012, and claims priority of Provisional Patent Application No. 61/543,359, filed Oct. 5, 2011, the disclosures of which are incorporated herein by reference in their entireties for all purposes.

FIELD OF INVENTION

The present invention relates to a method of tracing the flow of hydrocarbons from a subterranean reservoir following a hydraulic fracturing operation.

BACKGROUND OF THE INVENTION

The development of "tight" oil and gas from within geological strata of low permeability has increased dramatically over the past few years due to advances in drilling and completion technologies that allow operators to create geological flow through the use of multi stage hydraulic fracturing operations in highly deviated or horizontal wells. This involves the construction of a completion arrangement that allows specific vertically deviated or horizontal sections of a well bore to be isolated and hydraulically fractured. Repeating this process along the length of the well bore in the target reservoir area ensures that controlled hydraulic fracturing of every potential flow-contributing zone is achieved.

Once the hydraulic fracturing has been completed, previously injected fluid as well as hydrocarbons present within the formation surrounding the wellbore are allowed to flow to the surface from deep within the subsurface strata. Currently the logging of these "extended reach" wells is not routinely carried out as it is expensive, time consuming and can be relatively inaccurate when attempted in a long horizontal well bore. However, operators wish to better understand the effectiveness of specific hydraulic fracture project design in extracting trapped oil or gas from reservoir zones in order that they can improve design for future development wells.

In the oil and gas exploration and production industry it is common to hydraulically fracture a hydrocarbon-containing rock formation, or reservoir, in order to allow the hydrocarbon to flow out of the rock through the rock fractures. Many methods of fracturing a rock formation and maintaining a fracture open for the flow of hydrocarbon are known and practised in the industry. It is also known in the art to trace the flow of fluids from a reservoir, including fluids flowing after a fracturing operation, using tracers. For example, European Patent Number 1991759 describes a method of monitoring the flow of fluid within or from a reservoir comprising the steps of inserting a solid non-radioactive tracer into the reservoir by means of a perforation tool, thereafter collecting a sample of fluid within or flowing from the reservoir and analysing said sample to determine the amount of said tracer contained in the sample. From the presence or absence of tracer in the sample, its amount and other parameters such as timing of the sample collection etc., information about the fluid flow within the reservoir may be gathered. U.S. Pat. No. 3,623,842 describes a method of determining fluid saturations in reservoirs by injecting at least two tracers having different partition coefficients between fluid phases (e.g. oil and water) into the formation and monitoring the appearance of the two tracers in the produced fluids. Radioactive tracers have been widely used for many years in well-monitoring applications. As an example, see U.S. Pat. No. 5,077,471, in which radioactive tracers are injected into a perforated wellbore, sealed and then monitored for decay to indicate the fluid flow from the formation. U.S. Pat. No. 4,755,469 describes the use of rare metal tracers for tracing oil and associated reservoir fluids by mixing an oil-dispersible rare metal salt with oil or an oil-like composition, injecting the dissolved tracer composition into a subterranean reservoir and analysing oil fluids produced from a different part of the reservoir for the presence of the rare metal to determine whether the oil mixed with the tracer has been produced from the reservoir.

SUMMARY OF THE INVENTION

We have found that the application of hydrocarbon-partitioning tracer technology can be used to overcome some of the problems encountered in well-logging operations of highly deviated or horizontal wells subjected to hydraulic fracture stimulation.

In one embodiment of the invention, we provide a method of tracing flow of hydrocarbon from a subterranean reservoir comprising the steps of forming a dispersion consisting of a discontinuous condensed phase and a continuous liquid phase, said discontinuous condensed phase comprising a hydrocarbon-soluble tracer compound and said continuous liquid phase comprising an aqueous liquid; injecting a hydraulic fracturing fluid containing the dispersion down a well penetrating a hydrocarbon reservoir; thereafter collecting a sample of hydrocarbon fluid flowing from the reservoir and analysing the sample to determine whether the tracer compound is present in the sample.

In a second embodiment of the invention, the method of tracing flow of hydrocarbon from a subterranean reservoir comprises the steps of forming at least two tracer emulsions, each tracer emulsion comprising an oil or gas-soluble tracer compound in water and having a tracer characteristic which is different from the corresponding tracer characteristic of each other tracer emulsion, injecting a hydraulic fracture fluid containing at least one of said emulsions down a well penetrating a hydrocarbon reservoir, thereafter collecting a sample of hydrocarbon flowing from the reservoir and analysing the sample to determine whether any of the tracer compounds is present in the sample.

The methods are useful for identifying a part of the well from which the flow of hydrocarbon has originated, and may also be used to identify flow of reservoir fluids through plugs which have been placed in a well. It is usual to restrict the flow of fluids from selected parts of a well at various times during production by the placement of plugs which restrict or prevent flow of fluids downstream past the plug. When flow is to be restarted, one or more plugs are released to provide a passage for flow of fluids from locations upstream of the plug to locations downstream of the plug, for example to the wellhead. The methods, such as the first and second embodiments of the invention, may then be used to confirm that the selected plugs have been released by providing a method for identifying flow from parts of the well located upstream of the plug location.

We therefore further provide a method of confirming whether or not a barrier exists at a first location in a well which would, if present, restrict flow of a hydrocarbon from a location in a well upstream of said first location to a location downstream of said first location, comprising the steps of forming an emulsion of an oil or gas-soluble tracer compound in an aqueous liquid, injecting a hydraulic fracture fluid containing the emulsion down a well penetrating a hydrocarbon reservoir at said location upstream of said first location, thereafter collecting a sample of hydrocarbon flowing from the reservoir at a location downstream of said first location, analysing the sample to determine whether the tracer compound is present in the sample and inferring from the presence or absence of tracer in the sample whether said sample contains hydrocarbon which has flowed from a location upstream of said first location.

When practising the above method to confirm the release of a plug placed in the well, the method may further include taking action to remove the barrier by releasing the plug after the tracer has been injected into the well and before the sample is collected.

In a further embodiment of the invention we provide a method of identifying the flow of a hydrocarbon from a first location in a subterranean reservoir to a well located at a second location in said reservoir comprising the steps of forming an emulsion of at least one oil or gas-soluble tracer compound in an aqueous liquid, injecting a hydraulic fracture fluid containing the emulsion down a well penetrating a hydrocarbon reservoir at said first location, thereafter collecting a sample of hydrocarbon flowing from the well located at said second location, analysing the sample to determine whether the tracer compound is present in the sample and identifying from the analytical results a flow of hydrocarbon from the first location to the second location.

This method is useful for identifying the flow of reservoir fluids between wells, known as "cross-flow" and may provide information which is useful to optimise the spacing of wells within a particular reservoir or formation.

We also provide compositions useful for carrying out the methods of the invention, such compositions comprising a dispersion consisting of a discontinuous condensed phase and a continuous liquid phase, the discontinuous condensed phase comprising a hydrocarbon-soluble tracer compound and the continuous liquid phase comprising an aqueous liquid. The aqueous liquid may comprise a hydraulic fracturing fluid.

DETAILED DESCRIPTION OF THE INVENTION

The method of the invention is particularly effective for tracing positional flow of hydrocarbon fluids from the reservoir.

The term "hydrocarbon" is intended to include all forms of oil and hydrocarbon gas normally extracted from subterranean hydrocarbon reservoirs. When we use the term "hydrocarbon" without indicating whether oil or gas is intended, we mean to include oil and hydrocarbon gas. In this specification "gas" means hydrocarbon gas, e.g. natural gas unless any other kind of gas is specified. We use the term "dispersion" to mean a colloidal system having a discontinuous condensed (solid or liquid) phase incorporating a tracer compound and an aqueous liquid continuous phase. We use the term "emulsion" to mean a dispersion having a discontinuous liquid phase incorporating a tracer compound and an aqueous continuous phase.

The dispersion may comprise an emulsion, in which case the discontinuous phase comprises an organic liquid. The dispersion may alternatively comprise a colloidal solids dispersion in which case the discontinuous phase comprises particles of a colloidal solid.

The tracer compound(s) are insoluble in water but soluble in oil or gas at the prevailing conditions in the reservoir. By "insoluble" we mean that the solubility of the tracer between 50 degrees Celsius and 120 degrees Celsius is less than 0.1 g/liter. By "soluble" we mean that the solubility of the tracer between 50 degrees Celsius and 120 degrees Celsius is more than 100 g/liter. The tracer compounds are capable of forming a colloidal solids dispersion or an emulsion in a continuous aqueous phase, which is preferably either water, or a hydraulic fracturing fluid composition. Optionally, emulsifiers, rheology modifiers and/or stabilisers may be included in the dispersion, in the discontinuous tracer phase or the continuous aqueous phase. Interfacial stabilisers may be present at the boundary between the continuous phase and the discontinuous phase. The dispersion is capable of being mixed with a portion of a hydraulic fracturing fluid to the extent that it flows into the well with the fracturing fluid. The dispersion preferably is added to the fracturing fluid and flows as a discrete slug in the main aqueous based fluid flow. The tracer compound is selected to substantially or fully partition into a hydrocarbon when the dispersion comes into contact with oil and/or gas within the well or formation. The partition coefficient between the hydrocarbon/water) is therefore selected to be at least 1,000 (Log P=3). The tracer compound may be dissolved in an organic solvent. In that case, the discontinuous phase of the emulsion comprises a solution of the tracer compound in solvent. Suitable solvents include aromatic, cycloalkane or aliphatic chemicals such as petroleum distillates, examples of which include xylene, cyclohexane, or octane.

The tracer compound is preferably a halogenated aromatic, cycloalkane, or aliphatic compound including a halogen selected from the group consisting of Cl, Br and I. Suitable tracers include, but are not limited to 4-iodotoluene, 1,4-dibromobenzene, 1-chloro-4-iodobenzene, 5-iodo-m-xylene, 4-iodo-o-xylene, 3,5-dibromotoluene, 1,4-diiodobenzene, 1,2-diiodobenzene, 2,4-dibromomesitylene, 2,4,6-tribromotoluene, 1-iodonaphthalene, 2-iodobiphenyl, 9-bromophenanthrene, 2-bromonaphthalene, bromocyclohexane, 1,2-dichlorobenzene, 1,3-dichlorobenzene, 1,4-dichlorobenzene, 1-bromododecane, bromooctane, 1-bromo-4-chlorobenzene, bromobenzene, 1,2,3-trichlorobenzene, 4-chlorobenzylchloride, and 1-bromo-4-fluorobenzene.

The tracer compound is preferably a liquid or solid at room temperature. More than one tracer compound may be incorporated into the discontinuous phase of the dispersion. The dispersion may be formed prior to the injection of fracturing fluid and then added to the hydraulic fracturing fluid injection during the fracturing operation. Alternatively the tracer compound itself, or a solution of the tracer in a non-water-miscible organic solvent, may be added to and mixed directly with the hydraulic fracturing fluids during the injection, so that the dispersion is formed in situ, with the fracturing fluid forming the continuous aqueous phase of the dispersion. In either case, it is preferred that a known amount of tracer is added to the fracturing fluid entering the well during each stage.

In order for the tracer dispersion to be useful in identifying hydrocarbons flowing from a particular fracturing operation, it is important that it is introduced into the well in such a way that it can penetrate the formation at the location of an induced fracture. The tracer dispersion is preferably added to the fracturing fluids introduced into the well after the initial injection of fracture fluid creating the initial rock fracture matrix. Preferably the tracer dispersion is added during the initial injection of solid proppant particles, such as sand or ceramic proppant, during each stage, at the front of the solids injection in order that it will enter deep into the formation and will contact hydrocarbon if present. It is preferred that the tracer is consistently injected at the same point during each hydraulic stimulation stage. It is also preferred that the tracer is not injected towards the end of the stage because in that case it may be very close to the well bore and may flow back to surface whether or not it has contacted hydrocarbon.

A typical hydraulic fracturing operation in an oil or gas well is carried out in stages, many using between 10 and 40 stages per well. A tracer dispersion may be added to each stage or only to some of the stages. The tracer used in each tracer dispersion is preferably unique, in that it preferably has a different tracer characteristic from each other tracer compound used in the fracturing operation so that hydrocarbon flows produced from each stage may be identified. The tracer characteristic is usually the chemical identity of the tracer compound used. The tracer characteristic must be distinguishable from the tracer characteristic(s) of any other tracer compounds used.

Following completion of the fracture work, the well is prepared for back flow. During the back flowing of the well, reservoir oil/gas samples are taken on a regular basis, typically for the first 10 to 40 days. A small amount of the sample is analysed using appropriate methods to detect the presence and concentration of tracer compound. The method of analysing the sample is selected to be useful to identify and, preferably, to provide a measure of concentration of the tracer in the fluid sample. Suitable methods include chromatography; particularly gas chromatography (gc) coupled with appropriate detection means. Of particular use for identifying and measuring the concentration of halogenated aromatic compounds is gas chromatography coupled with mass spectrometry allowing detection sensitivities to low parts per billion to be achievable.

The completion work may involve the plugging of a section of a well to prevent flow of fluid. This may be undertaken to block or control the flow of reservoir fluids from a certain part of the well, e.g. from the toe of the well to towards the heel or surface. It may be useful to block the flow of fracturing fluid at a particular location in the well in order to fracture a particular part of the reservoir. The flow may be blocked, or restricted, e.g. as to direction or flow rate, by means of a barrier which can be in the form of a plug or a well completion device, such as a screen, having at least one flow control means comprising at least one hole and which, in a first condition allows flow through said hole and in a second condition blocks flow through said hole. Such devices may be operated to enable or block flow by means of a tool or by pressure built up in the well at the location of the barrier. Such devices are available as sliding sleeve arrangements for example. When the barrier is a plug, for example filled with cement, the plug may be drilled out in order to enable flow of fluid past the location of the plug. Operating a completion device to enable flow of fluid or drilling out a plug may be referred to as "releasing" the plug or barrier. In a typical well completion operation many such barriers to flow may be installed as the well is completed in stages. In a typical operation, each barrier may be associated with at least one reservoir fracturing operation. Each fracturing operation is therefore conveniently associated with a particular tracer compound which is different from tracer compounds used in other fracturing operations in the well. When the method of the invention is used during a fracturing operation and a barrier, which has been placed downstream of the fracturing operation (for example to enable fracturing of another fracturing operation downstream of the first (upstream) fracturing operation), is released or removed, then the detection in a sample collected downstream of the barrier location (e.g. at the well-head) of the tracer placed with the upstream fracturing operation confirms to the completion operator that the barrier has been released properly and that hydrocarbon fluid has flowed from the reservoir at the upstream fracture past the location of the barrier.

It is preferred to record the amount of hydrocarbon produced by the well over particular time periods during the period of taking samples for tracer analysis. In a particularly preferred method, concentration versus time curves are created for each tracer. Integration of each curve over a specific period of time during flow back is carried out to provide a profile of production from each fracture stage of the well. A comparison of tracer flow back to surface versus the amount of tracer emulsion injected at the surface is carried out versus time. The recovery of each tracer may be compared using a normalization process to determine the relative contribution of each stage over a specified time period. This relative flow data is used to determine relative flow from each hydraulic stimulation stage to surface versus time.

BRIEF DESCRIPTION OF DRAWINGS

FIG. 1A is a graph showing the % produced tracer in samples of oil collected over 14 days from stages 1-8 in the Example.

FIG. 1B is a graph showing the % produced tracer in samples of oil collected over 14 days from stages 9-16 in the Example.

FIG. 2 shows the variation in oil production between the stages over 14 days.

FIG. 3 is a graph showing the cumulative amount of tracer in the produced oil over 14 days.

EXAMPLE

A horizontal oil well was to be stimulated with a sixteen stage hydraulic fracture program evenly distributed along the well bore length at 300 feet intervals. An oil sample was taken from another well within the specific oilfield. A number of candidate organic tracers were mixed with a suitable solvent and added to a water solution containing viscosity modifiers similar to those used during a hydraulic fracturing operation and a small amount of emulsion promoter. The mixture was blended to create a stable emulsion. Oil taken from the specific oilfield was added to the emulsion and each of the candidate organic tracers' partition coefficients measured between the aqueous and organic phases. Sixteen unique organic tracers that formed stable emulsions and had partition coefficients of 1,000 and above were selected for the project. One of the sixteen unique organic based tracers was injected at the leading edge of each hydraulic fracture stage when proppants were first added to the hydraulic fluids. The injected tracer formed an emulsion in the hydraulic fracturing fluid. The amount of tracer injected into each stage was 250, 500 or 1000 grams. Tracer was not injected into stage 3. Following completion of the stimulation treatment the well was cleaned and production started. Samples of oil were collected on a regular basis and analysed for tracer presence. Results of the analysis are shown in FIGS. 1-3. FIG. 1A shows data for stages 1-8 whilst stages 9-16 are shown in FIG. 1B. The results show that initial oil flow was dominated from stages closer to the heel of the well with mid-point being relatively low and toe flow response from only the last two stages. The oil flow rate in barrels per hour is shown in FIGS. 1 and 3 as a bold dashed line. As flow continued, toe flow overall contribution increased but mid-well flow continued to be relatively low with as many as 4 stages (Stages 3, 4, 6, and 10) contributing zero to the overall production. This example shows that the contribution to production of each stage in the well can be analysed using the method of the invention.

What is claimed:

1. A method of tracing flow of hydrocarbon from a subterranean reservoir comprising the steps of forming an emulsion comprising a discontinuous organic liquid phase and a continuous liquid phase, said discontinuous organic liquid phase comprising a hydrocarbon-soluble tracer compound and said continuous liquid phase comprising an aqueous liquid, by adding the tracer compound or a solution of the tracer compound in a non-water miscible solvent to a hydraulic fracturing fluid and mixing he tracer or said solution of the tracer with hydraulic fracturing fluid during injection of the fracturing fluid down a well penetrating a hydrocarbon reservoir, thereafter collecting a sample of hydrocarbon fluid flowing from the reservoir and analyzing the sample to determine whether the tracer compound is present in the sample.

2. A method according to claim 1 wherein the tracer compound has a solubility in water between 50 and 120 degrees Celsius of less than 0.1 g/liter.

3. A method according to claim 1 wherein the partition coefficient of the tracer compound between the hydrocarbon/water is selected to be at least 1,000.

4. A method according to claim 1 wherein the discontinuous organic liquid phase of the emulsion comprises a solution of the tracer compound in an organic solvent.

5. A method according to claim 1 wherein said emulsion contains an additive selected from the group consisting of emulsifiers, stabilisers and rheology modifiers.

6. A method according to claim 1 wherein the tracer compound is selected from the group consisting of a halogenated aromatic compound, a halogenated cycloalkane and a halogenated aliphatic compound, wherein the halogen is selected from the group consisting of Cl, Br and I.

7. A method according to claim 6 wherein the tracer compound is selected from the group consisting of 4-iodotoluene, 1,4-dibromobenzene, 1-chloro-4-iodobenzene, 5-iodo-m-xylene, 4-iodo-o-xylene, 3,5-dibromotoluene, 1,4-diiodobenzene, 1,2-diiodobenzene, 2,4-dibromomesitylene, 2,4,6-tribromotoluene, 1-iodonaphthalene, 2-iodobiphenyl, 9-bromophenanthrene, 2-bromonaphthalene, bromocyclohexane, 1,2-dichlorobenzene, 1,3-dichlorobenzene, 1,4-dichlorobenzene, 1-bromododecane, bromooctane, 1-bromo-4-chlorobenzene, bromobenzene, 1,2,3-trichlorobenzene, 4-chlorobenzylchloride and 1-bromo-4-fluorobenzene.

8. A method according to claim 1 wherein the discontinuous organic liquid phase of the emulsion contains more than one tracer compound.

9. A method according to claim 1 wherein a formation fracturing operation is carried out in more than one stage and a known amount of tracer is added to the hydraulic fracturing fluid injected into the well during each stage.

10. A method according to claim 1 wherein an initial injection of hydraulic fluid is carried out, said initial injection of hydraulic fluid creating an initial rock fracture matrix and the injection of hydraulic fracturing fluid containing the emulsion occurs after an initial injection of hydraulic fracture fluid creating an initial rock fracture matrix.

11. A method according to claim 1 wherein solid proppant particles are injected into the well with hydraulic fracturing fluid and the injection of hydraulic fracturing fluid containing the emulsion occurs during the injection of solid proppant particles at the front of a solids injection.

12. A method of tracing floe of hydrocarbon from a subterranean reservoir comprising the steps of:
   (a) forming at least two tracer emulsions, each tracer emulsion comprising a discontinuous phase comprising a hydrocarbon-soluble tracer compound in a continuous phase comprising an aqueous liquid and each tracer compound having a tracer characteristic which is different from the tracer characteristic of the tracer compound of each other tracer emulsion where each emulsion is formed in situ by adding the tracer compound or a solution of the tracer compound in a non-water miscible solvent to a hydraulic fracturing fluid and mixing the tracer or said solution of the tracer with a hydraulic fracturing fluid during injection of the fracturing fluid down a well penetrating a hydrocarbon reservoir, where the subterranean reservoir is fractured in stages and each emulsion is formed during injection of a different stage,
   (b) collecting a sample of hydrocarbon fluid flowing from the reservoir after injecting said hydraulic fracture fluid containing the tracer emulsion and
   (c) analyzing the sample to determine whether any of the tracer compounds is present in the sample.

13. A method according to claim 12, wherein said subterranean reservoir is fractured in stages and a hydraulic fracture fluid containing at least one unique tracer emulsion is injected into the well at each stage.

14. A method according to claim 12 wherein each tracer compound has a solubility in water between 50 and 120 degrees Celsius of less than 0.1 g/liter.

15. A method according to claim 12 wherein the partition coefficient of each tracer between the hydrocarbon/water is selected to be at least 1,000.

16. A method according to claim 12 wherein the tracer compound is selected from the group consisting of a halogenated aromatic compound, a halogenated cycloalkane or a halogenated aliphatic compound, wherein the halogen is selected from the group consisting of Cl, Br and I.

17. A method according to claim 16 wherein each tracer compound is selected from the group consisting of 4-iodotoluene, 1,4-dibromobenzene, 1-chloro-4-iodobenzene, 5-iodo-m-xylene, 4-iodo-o-xylene, 3,5-dibromotoluene, 1,4-diiodobenzene, 1,2-diiodobenzene, 2,4-dibromomesitylene, 2,4,6-tribromotoluene, 1-iodonaphthalene, 2-iodobiphenyl, 9-bromophenanthrene, 2-bromonaphthalene, bromocyclohexane, 1,2-dichlorobenzene, 1,3-dichlorobenzene, 1,4-dichlorobenzene, 1-bromododecane, bromooctane, 1-bromo-4-chlorobenzene, bromobenzene, 1,2,3-trichlorobenzene, 4-chlorobenzylchloride and 1-bromo-4-fluorobenzene.

18. A method according to claim 12 wherein at least one of the emulsions is formed prior to the injection of hydraulic fracturing fluid and then added to the hydraulic fluid injection during a fracturing operation.

19. A method according to claim 12 wherein the hydraulic fracturing fluid containing the emulsion is introduced into the well after an initial injection of fracture fluid creating an initial rock fracture matrix in each stage.

20. A method according to claim 12, wherein solid proppant particles are injected into the well with hydraulic fracturing fluid and the injection of hydraulic fracturing fluid containing the emulsion occurs during the injection of said solid proppant particles at the front of a solids injection.

21. A method according to claim 12, wherein said subterranean reservoir is fractured in stages and a hydraulic fracture fluid containing at least one unique tracer emulsion is injected into the well at not all of the stages.

22. A method of identifying a flow of a hydrocarbon from a first location in a subterranean reservoir to a well located at a second location in said reservoir comprising the steps of:
   a) forming an emulsion of at least one hydrocarbon-soluble tracer compound in an aqueous liquid, by adding the tracer compound or a solution of the tracer compound in a non-water miscible solvent to a hydraulic fracturing fluid and mixing the tracer or said solution of the tracer with hydraulic fracturing fluid during injection of the fracturing fluid down a well penetrating a hydrocarbon reservoir at said first location,
   b) thereafter collecting a sample of hydrocarbon flowing from the well located at said second location,
   c analyzing the sample to determine whether the tracer compound is present in the sample and
   d determining, from the results of said analysis, whether a flow of hydrocarbon has occurred from the first location to the second location.

23. A method of confirming a presence at a first location in a well of a barrier which would, if present, restrict flow of a hydrocarbon from a location in a well upstream of said first location to a location downstream of said first location, comprising the steps of:
   a) forming an emulsion of a hydrocarbon-soluble tracer compound in an aqueous liquid, by adding the tracer compound or a solution of the tracer compound in a non-water miscible solvent to a hydraulic fracturing fluid and mixing the tracer or said solution of the tracer with a hydraulic fracturing fluid during injection of the fracturing fluid down a well penetrating a hydrocarbon reservoir at said location upstream of said first location,
   b) thereafter collecting a sample of hydrocarbon flowing from the reservoir at a location downstream of said first location,
   c analyzing the sample to determine a presence or an absence of the tracer compound in the sample,
   d inferring from the presence or absence of tracer compound in the sample whether said sample contains hydrocarbon which has flowed from said location upstream of said first location, thereby to determine whether said barrier exists at said first location.

24. A method according to claim 23, wherein at least one said barrier is placed in the well and further comprising the step of releasing a barrier after the emulsion has been injected into the well and before the sample is collected.

25. A method according to claim 23, wherein the barrier comprises a plug which has been placed in the well.

26. A method according to claim 23, wherein said barrier comprises a well-completion device having at least one flow control means comprising at least one hole and which, in a first condition allows flow through said hole and in a second condition blocks flow through said hole.

* * * * *